United States Patent
Zhang et al.

(10) Patent No.: US 9,001,750 B2
(45) Date of Patent: Apr. 7, 2015

(54) METHOD AND APPARATUS FOR SIGNALING USER EQUIPMENT CAPABILITIES

(75) Inventors: Danlu Zhang, San Diego, CA (US); Aziz Gholmieh, Del Mar, CA (US); Sharad Deepak Sambhwani, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 13/079,549

(22) Filed: Apr. 4, 2011

(65) Prior Publication Data

US 2011/0243083 A1 Oct. 6, 2011

Related U.S. Application Data

(60) Provisional application No. 61/321,048, filed on Apr. 5, 2010, provisional application No. 61/330,793, filed on May 3, 2010.

(51) Int. Cl.
*H04W 72/04* (2009.01)
*H04W 8/22* (2009.01)

(52) U.S. Cl.
CPC ............................... *H04W 8/22* (2013.01)

(58) Field of Classification Search
USPC ................ 370/431–462, 522–529, 328, 329, 370/552–559
See application file for complete search history.

(56) References Cited

U.S. PATENT DOCUMENTS

| 5,774,501 | A | 6/1998 | Halpern et al. |
| 7,317,726 | B2 | 1/2008 | Beshai |
| 7,961,700 | B2 | 6/2011 | Malladi et al. |
| 2009/0147748 | A1 | 6/2009 | Ofuji et al. |

(Continued)

FOREIGN PATENT DOCUMENTS

| CN | 101345988 A | 1/2009 |
| EP | 2262333 A1 | 12/2010 |

(Continued)

OTHER PUBLICATIONS

Intel Corporation, "Special Cells and Carrier Management/Configuration" [online], 3GPP TSG-RAN WG2 # 68bis R2-100581, Internet <URL:http://www.3gpp.org/ftp/tsg_ran/WG2_RL2/TSGR2_68bis/Docs/R2-100581 .zip>, Jan. 12, 2010.*

(Continued)

*Primary Examiner* — Huy D Vu
*Assistant Examiner* — Teisha D Hall
(74) *Attorney, Agent, or Firm* — Darren M. Simon

(57) ABSTRACT

Apparatus and methods that provide wireless communications, where a method for wireless communications includes receiving at a Node B a first set of bits indicating at least two frequency bands supported by a UE for HSDPA, the first set of bits further specifying a number of downlink adjacent carriers supported by the UE for each of the at least two frequency bands. The method also includes transmitting a first set of bits indicating support for a set of carriers for each band, the information comprising information related to a maximum channel bandwidth supported for that band; and transmitting a second set of bits indicating a configuration for the set of carriers under which multiple uplinks will be supported.

21 Claims, 10 Drawing Sheets

(56) References Cited

U.S. PATENT DOCUMENTS

| | | | |
|---|---|---|---|
| 2009/0190534 | A1 | 7/2009 | Yamada et al. |
| 2009/0257387 | A1 | 10/2009 | Gholmieh et al. |
| 2010/0014467 | A1 | 1/2010 | Wang et al. |
| 2010/0027457 | A1 | 2/2010 | Okuda |
| 2010/0267394 | A1 | 10/2010 | Wu |
| 2010/0329200 | A1 | 12/2010 | Chen et al. |
| 2011/0051711 | A1 | 3/2011 | Kishiyama et al. |
| 2011/0158089 | A1 | 6/2011 | Sambhwani et al. |
| 2011/0170420 | A1 | 7/2011 | Xi et al. |
| 2011/0205976 | A1* | 8/2011 | Roessel et al. ............... 370/329 |
| 2012/0008563 | A1 | 1/2012 | Johansson et al. |
| 2012/0176919 | A1 | 7/2012 | Callender et al. |
| 2012/0178465 | A1 | 7/2012 | Lin et al. |
| 2012/0183095 | A1 | 7/2012 | Gholmieh et al. |

FOREIGN PATENT DOCUMENTS

| | | |
|---|---|---|
| JP | 2012530437 A | 11/2012 |
| JP | 2012530438 A | 11/2012 |
| KR | 20080025130 A | 3/2008 |
| WO | 2006116102 A2 | 11/2006 |
| WO | 2007000095 A1 | 1/2007 |
| WO | WO-2009119834 A1 | 10/2009 |
| WO | WO-2010145933 A1 | 12/2010 |
| WO | WO-2010145939 A1 | 12/2010 |
| WO | WO-2011127094 A1 | 10/2011 |

OTHER PUBLICATIONS

International Search Report and Written Opinion—PCT/US2011/031303, ISA/EPO—Jul. 6, 2011.

Nokia et al., "Discussion on UE categories 5 for 4-carrier HSDPA", 3GPP Draft; R1-101518 4C-HSDPA UE Categories, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010, XP050418959, [retrieved on Feb. 16, 2010].

Nokia Siemens Networks et al., "Bandlcarrier Combination Signaling for 4c-HSDPA and 8c-HSDPA", 3GPP Draft; R2-110291 signaling, 3rd Generation Partnership Project (3gpp), Mobile Competence Centre, 650, Route Des Lucioles, F-06921 Sophia-Antipolis Cedex ; Jan. 10, 2011, France, vol. RAN WG2, no. Dublin, Ireland; 20110117, XP050492795.

Nokia Siemens Networks, Nokia Corporation, "UE capability signalling for CA and MIMO in REL10", 3GPP TSG-RAN WG2 Meeting #72, Jacksonville, U.S.A, Nov. 15-19, 2010, R2-106411.

Qualcomm; "Alternative Dual Band Signaling for Rel—10 R2-110883", 3GPP TSG RAN 2#73, Feb. 15, 2011, XP55029310, Retrieved from the Internet : URL: http://www.3gppl.net/ftp/tsg-ran/WG2—R L2/TSGR2 73/Docs/R2-110883.zip.

Qualcomm Incorporated: "Alternate Dual-Band Signaling for Rel-10", 3GPP Draft; 25331 CRXXXX (REL-10) R2-110884 Alternate Dual Bands Ignaling, ~3rd Generation Partnership Project (3GPP) , Mobile Competence Centre ; Feb. 15, 2011, 650, Route Des Lucioles ; F-06921 Sophia-Anti Polis Cedex ; France, vol. RAN WG2, no. Taipei, Taiwan; 20110221, XP050493570.

Qualcomm Incorporated: "Signaling and support of band combinations for 4C-HSDPA", 3GPP Draft; R2-102263, 3rd Generation Partnership Project (3GPP), Mobile Competence Centre ; 650, Route Des Lucioles ; F-06921 Sophia-Antipolis Cedex ; France, vol. RAN WG2, no. Beijing, china; 20100412, Apr. 6, 2010, XP050422618, [retrieved on Apr. 6, 2010].

Qualcomm Incorporated: "Signaling and Support of Band Combinations in 4C-HSDPA", 3GPP Draft; R2-103810 Signalling Support Band Combinations, 3rd-Generation-Partnerpship Project (3GPP), Mobile Competence Centre ; Jun. 22, 2010, 650, Route Des Lucioles ; F-06921 Sophia-Anti Polis Cedex ; France, vol. RAN WG2, no. Stockholm, Sweden; 20100628, XP050451243.

Calabrese, F.D., et al. (2008) Adaptive transmission bandwidth based packet scheduling for LTE uplink, IEEE, 978-1-4244-1722-3/08, pp. 1-5.

Bege A, et al., "Coding Objects Related to Catalan Numbers", Studia Univ. Babes-Bolyai, Informatica, Jan. 1, 2001, vol. XLVI, No. 1, XP55029004.

Intel Corporation, "Special Cells and Carrier Management/Configuration" [online], 3GPP TSG-RAN WG2 # 68bis R2-100581, Internet <URL:http://www.3gpp.org/ ftp/tsg_ranNVG2_RL2ITSGR2_68bis/Docs/R2-100581.zip>, Jan. 12, 2010.

* cited by examiner

METHOD AND APPARATUS FOR SIGNALING USER EQUIPMENT CAPABILITIES

CROSS-REFERENCE TO RELATED APPLICATIONS

This application claims the benefit of U.S. Provisional Patent Application Ser. No. 61/321,048, entitled "UE CAPABILITY SIGNALING IN 4C-HSDPA", which was filed on Apr. 5, 2010; and U.S. Provisional Patent Application Ser. No. 61/330,793, entitled "UE CAPABILITY SIGNALING IN 4C-HSDPA", which was filed on May 3, 2010. The entireties of the aforementioned applications are herein incorporated by reference.

BACKGROUND

1. Field

Aspects of the present disclosure relate generally to wireless communication systems, and more particularly, to a method and apparatus for signaling User Equipment (UE) capabilities.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Mobile Telecommunications System (UMTS), a third generation (3G) mobile phone technology supported by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA).

As the demand for mobile broadband access continues to increase, research and development continue to advance UMTS technologies—not only to meet the growing demand for mobile broadband access, but to advance and enhance the user experience with mobile communications. For example, UMTS also supports enhanced 3G data communications protocols, such as High Speed Packet Access (HSPA), which provides higher data transfer speeds and capacity to associated UMTS networks. HSPA is an amalgamation of two mobile telephony protocols, High Speed Downlink Packet Access (HSDPA) and High Speed Uplink Packet Access (HSUPA), which extends and improves the performance of existing WCDMA protocols for high-speed data transfer in mobile cellular networks. In a version known as Dual-Cell (DC) HSDPA, a UE may detect up to 2 downlink carriers. In 4C-HSDPA, a UE may detect and be configured to use up to 4 downlink carriers. In DC-HSUPA, the UE may be configured to use two uplink carriers for data transmission to the base station. It would be desirable to provide mechanisms allowing the UE to signal to the base station the UE's capabilities for data reception and transmission across the various carriers and bands.

SUMMARY

The following presents a simplified summary of one or more aspects of a method and apparatus for signaling User Equipment (UE) capabilities. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes receiving at a Node B a first set of bits indicating at least two frequency bands supported by a UE for HSDPA, the first set of bits further specifying a number of downlink adjacent carriers supported by the UE for each of the at least two frequency bands.

In another aspect, a method for wireless communications includes transmitting a first set of bits indicating support for a set of carriers for each band, the first set of bits comprising information related to a maximum channel bandwidth supported for that band; and transmitting a set of bits indicating a configuration for the set of carriers under which multiple uplinks will be supported.

In yet another aspect, an apparatus for wireless communications is provided that includes a receiver configured to receive at a Node B a first set of bits indicating at least two frequency bands supported by a UE for HSDPA, the first set of bits further specifying a number of downlink adjacent carriers supported by the UE for each of the at least two frequency bands; and a transmitter configured to signal to the UE to support a specific number of carriers for each of the at least two frequency bands.

In yet another aspect, an apparatus for wireless communications is provided that includes a transmitter configured to transmit to a Node B a first set of bits indicating at least two frequency bands supported by a UE for HSDPA, the first set of bits further specifying a number of downlink adjacent carriers supported by the UE for each of the at least two frequency bands; and a receiver configured to receive from the Node B a configuration of carriers to be supported by the UE.

In yet another aspect, an apparatus for wireless communications is provided that includes a receiver configured to receive downlink transmissions on a plurality of carriers according to HSPA; and a transmitter configured to signal a first set of bits to a Node B indicating a maximum downlink channel bandwidth supported for each of at least one supported frequency band.

In yet another aspect, an apparatus for wireless communications is provided that includes a receiver configured to receive downlink transmissions on a plurality of carriers according to HSPA; and, a transmitter configured to signal to a Node B an allowed combination of uplink and downlink frequency bands supported by a UE, the transmitter further configured to signal a first set of bits indicating whether each of a plurality of carrier allocations between the frequency bands is supported by the UE.

In yet another aspect, an apparatus for wireless communications is provided that includes means for receiving at a Node B a first set of bits indicating at least two frequency bands supported by a UE for HSDPA, the first set of bits further specifying a number of downlink adjacent carriers supported by the UE for each of the at least two frequency bands.

In yet another aspect, an apparatus for wireless communications is provided that includes means for transmitting a first set of bits indicating support for a set of carriers for each band, the a first set of bits comprising information related to a maximum channel bandwidth supported for that band; and means for transmitting a set of bits indicating a configuration for the set of carriers under which multiple uplinks will be supported.

In yet another aspect, a computer-program product for wireless communications is provided that includes a machine-readable medium including instructions executable for receiving at a Node B a first set of bits indicating at least two frequency bands supported by a UE for HSDPA, the first set of bits further specifying a number of downlink adjacent carriers supported by the UE for each of the at least two frequency bands.

In yet another aspect, a computer-program product for wireless communications is provided that includes a machine-readable medium including instructions executable transmitting a first set of bits indicating support for a set of carriers for each band, the a first set of bits comprising information related to a maximum channel bandwidth supported for that band; and transmitting a set of bits indicating a configuration for the set of carriers under which multiple uplinks will be supported.

In yet another aspect, an apparatus for wireless communications is provided that includes an antenna; a receiver coupled to the antenna and configured to receive at a Node B a first set of bits indicating at least two frequency bands supported by a UE for HSDPA, the first set of bits further specifying a number of downlink adjacent carriers supported by the UE for each of the at least two frequency bands; and a transmitter configured to signal to the UE to support a specific number of carriers for each of the at least two frequency bands.

In yet another aspect, an apparatus for wireless communications is provided that includes an antenna; a transmitter coupled to the antenna and configured to transmit to a Node B a first set of bits indicating at least two frequency bands supported by a UE for HSDPA, the first set of bits further specifying a number of downlink adjacent carriers supported by the UE for each of the at least two frequency bands; and a receiver configured to receive from the Node B a configuration of carriers to be supported by the UE.

In yet another aspect, an apparatus for wireless communications is provided that includes a transmitter configured to signaling a first set of bits indicating a maximum downlink channel bandwidth supported by a User Equipment (UE) for each of at least one frequency band supported; and the transmitter further is configured to signaling a second set of bits indicating a maximum configuration of downlink channel bandwidth for which the UE will further accommodate multicarrier uplink transmissions.

In yet another aspect, an apparatus for wireless communications is provided that includes a transmitter configured to signaling an allowed combination of uplink and downlink frequency bands supported by a User Equipment (UE); and the transmitter is further configured to signaling a first set of flags indicating whether each of a plurality of carrier allocations between the frequency bands is supported by the UE.

In yet another aspect, an apparatus for wireless communications is provided that includes means for signaling a first set of bits indicating a maximum downlink channel bandwidth supported by a User Equipment (UE) for each of at least one frequency band supported; and means for signaling a second set of bits indicating a maximum configuration of downlink channel bandwidth for which the UE will further accommodate multicarrier uplink transmissions.

In yet another aspect, an apparatus for wireless communications is provided that includes means for signaling an allowed combination of uplink and downlink frequency bands supported by a User Equipment (UE); and means for signaling a first set of flags indicating whether each of a plurality of carrier allocations between the frequency bands is supported by the UE.

In yet another aspect, a computer-program product for wireless communications is provided that includes a machine-readable medium including instructions executable for signaling a first set of bits indicating a maximum downlink channel bandwidth supported by a User Equipment (UE) for each of at least one frequency band supported; and signaling a second set of bits indicating a maximum configuration of downlink channel bandwidth for which the UE will further accommodate multicarrier uplink transmissions.

In yet another aspect, a computer-program product for wireless communications is provided that includes a machine-readable medium including instructions executable signaling an allowed combination of uplink and downlink frequency bands supported by a User Equipment (UE); and signaling a first set of flags indicating whether each of a plurality of carrier allocations between the frequency bands is supported by the UE.

In yet another aspect, an apparatus for wireless communications is provided that includes an antenna; and a transmitter configured to signaling, via the antenna, a first set of bits indicating a maximum downlink channel bandwidth supported by a User Equipment (UE) for each of at least one frequency band supported; and the transmitter further is configured to signaling a second set of bits indicating a maximum configuration of downlink channel bandwidth for which the UE will further accommodate multicarrier uplink transmissions.

In yet another aspect, an apparatus for wireless communications is provided that includes an antenna; and a transmitter configured to signaling, via the antenna, an allowed combination of uplink and downlink frequency bands supported by a User Equipment (UE); and the transmitter is further configured to signaling a first set of flags indicating whether each of a plurality of carrier allocations between the frequency bands is supported by the UE.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

So that the manner in which the above-recited features of the disclosure set forth herein can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 B is a flow diagram illustrating a UE capabilities signaling process involving a UE signaling for dual band support in accordance with another aspect of the disclosure;

FIG. 1 C is a flow diagram illustrating a User Equipment (UE) capabilities signaling process involving a Node B in accordance with an aspect of the disclosure;

FIG. 1 D is a flow diagram illustrating a UE capabilities signaling process involving a UE in accordance with an aspect of the disclosure;

DETAILED DESCRIPTION

Figure 1A:
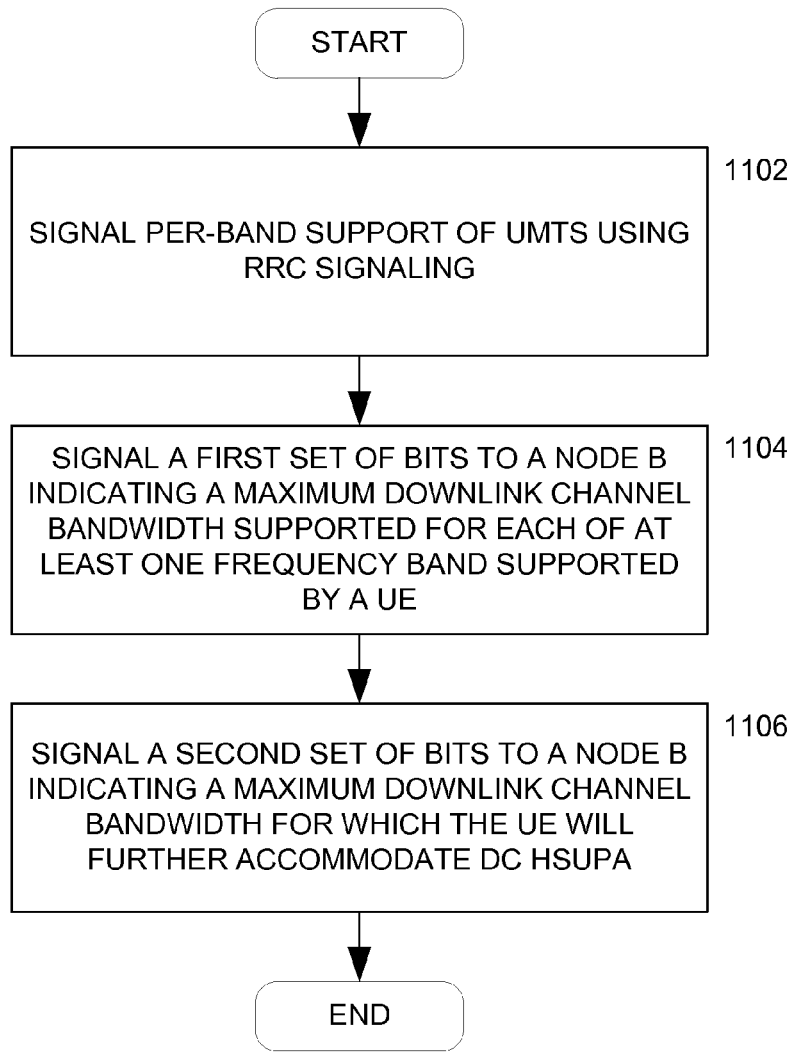
FIG. 1 A is a flow diagram illustrating a UE capabilities signaling process involving a UE signaling for a single band support in accordance with another aspect of the disclosure.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In 4C-HSDPA, the UE may be configured for data reception on 3 or 4 downlink carriers in one or two frequency bands. In order to properly configure the data transmissions, the network should have access to certain information about the bandwidth capabilities of the UE.

First, the network should be aware of the total number of carriers that may be configured for downlink data transmission to a particular UE across the two bands. It will be appreciated that the total number of carriers may be determined by several factors. For example, the UE baseband processing capacity may dictate the supported number of carriers. In one aspect of the UE capabilities signaling, the UE may inform the network of its capability via the transmission of a UE category to which it belongs.

Second, the network should know the UE bandwidth capability on each band, which is also the maximum number of carriers the UE can support in each band for single-band operations. Exemplary mechanisms for allowing the UE to signal such information the network are further described herein below.

Third, the network should know the number of carriers in each band the UE can support simultaneously for dual-band operations. It will be appreciated that a UE with a certain bandwidth capability may nevertheless not support all possible carrier combinations simultaneously over such bandwidth, as not all such combinations may have been tested. For example, a UE supporting 4 carriers and with 20 MHz bandwidth capability in each band may be configured by the network with carrier combinations of (1,3), (3,1), (2,2), (1,2), (2,1) and so on, wherein the first number of each ordered pair represents the maximum number of carriers the UE can support for the anchor band, while the second number of each ordered pair represents the maximum number of carriers the UE can support on the non-anchor or "secondary" band. However, only a subset of such carrier combinations may have been tested by the UE. Therefore, the UE needs to signal to the network the preferred subset of carrier combinations it can support during actual system operation. Mechanisms for signaling this information are further described herein below.

Fourth, when the UE is generally capable of supporting DC-HSUPA, the network still needs to know whether the UE is capable of supporting DC-HSUPA for each possible downlink carrier combination across the bands. It will be appreciated that the uplink to downlink frequency separation is reduced with more carriers configured on either the downlink or uplink, and so the UE capability of supporting DC-HSUPA is dependent on the number of carriers configured on the downlink. For example, a UE may support DC-HSUPA in the first band with a (2,1) downlink carrier combination, but that same UE may not support DC-HSUPA with a (2,2) combination. Mechanisms for signaling this information are further described hereinbelow.

Multi-carrier HSPA is introduced as DC-HSDPA starting in Rel.8. In Rel.9, DC-HSDPA is extended to incorporate MIMO, DB-DC-(dual-band dual-carrier) HSDPA and DC-HSUPA. The number of carriers the UE may support simultaneously is always indicated by the UE categories as signaled through mechanisms available in Rel.8 and Rel.9.

The UE signals all the bands it supports in the Information Element (IE) "UE radio access capability extension," which has been specified since Rel.99. This supportability is based on single-band operation. In Rel.8, the UE can support dual-carrier operation in any band it supports.

The supported band combination is signaled in the IE "UE radio access capability." The following table in 25.101 Rel.9 lists all the band combinations allowed in DB-DC-HSDPA thus far.

TABLE 1

DB-DC-HSDPA configurations

| DB-DC-HSDPA Configuration | UL Band | DL Bands |
| --- | --- | --- |
| 1 | I or VIII | I and VIII |
| 2 | II or IV | II and IV |
| 3 | I or V | I and V | wherein the uplink (UL) and downlink (DL) operating bands are given by the following table from Rel.9:

| Operating Band | UL Frequencies (UE transmit, Node B receive) | DL Frequencies (UE receive, Node B transmit) |
| --- | --- | --- |
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |
| VII | 2500-2570 MHz | 2620-2690 MHz |
| VIII | 880-915 MHz | 925-960 MHz |
| IX | 1749.9-1784.9 MHz | 1844.9-1879.9 MHz |
| X | 1710-1770 MHz | 2110-2170 MHz |

-continued

| Operating Band | UL Frequencies (UE transmit, Node B receive) | DL Frequencies (UE receive, Node B transmit) |
|---|---|---|
| XI | 1427.9-1447.9 MHz | 1475.9-1495.9 MHz |
| XII | 698-716 MHz | 728-746 MHz |
| XIII | 777-787 MHz | 746-756 MHz |
| XIV | 788-798 MHz | 758-768 MHz |
| XV | Reserved | Reserved |
| XVI | Reserved | Reserved |
| XVII | Reserved | Reserved |
| XVIII | Reserved | Reserved |
| XIX | 830-845 MHz | 875-890 MHz |
| XX | 832-862 MHz | 791-821 MHz |
| XXI | 1447.9-1462.9 MHz | 1495.9-1510.9 MHz |

When more than 2 carriers in total are supportable by the UE, the network needs specific information on the number of carriers the UE supports for each and every band supported if all the carriers configured are in that band. For multiple carrier configurations in a single band, such as 2 adjacent, 3 adjacent or 4 adjacent carriers, the following exemplary signaling mechanism may be adopted. First, the existing Radio Resource Control (RRC) signaling for the per-band support of UMTS may continue to be used. Second, for each band supported by the UE, the UE may additionally signal a first set of bits to indicate the maximum channel bandwidth supported for that band, and a second set of bits to indicate a maximum bandwidth for which DC-HSUPA will be further supported by the UE.

FIG. 1A illustrates a UE capabilities signaling process 1100 for UE capabilities signaling in a single band where, at block 1102, per-band support of UMTS is signaled using RRC signaling.

At block 1104, a first set of bits is signaled to a Node B indicating a maximum downlink channel bandwidth supported for each of at least one frequency band supported by a UE. In an example, the first set of bits may include two bits that specify one of four values, e.g., 5, 10, 15, or 20 MHz. The bandwidth indicated by the first set of bits may correspond to the maximum bandwidth supported by the UE for the single band.

At block 1106, a second set of bits is signaled to a Node B indicating a maximum downlink channel bandwidth for which the UE will further accommodate DC-HSUPA. Continuing with the example, the second set of bits may include two bits that specify one of three values, e.g., 10, 15, or 20 MHz. The bandwidth indicated by the second set of bits may indicate that the UE will support DC-HSUPA when the specified bandwidth is configured on the downlink.

For example, a UE could signal that it supports a maximum channel bandwidth of 4 adjacent carriers (20 MHz) in Band A using the first set of bits, but only supports DC-HSUPA with up to 15 MHz of downlink configured carriers in that Band using the second set of bits. In other words, in this example, if a UE is configured with 4 adjacent carriers on the downlink, it cannot be configured with dual uplinks, but if it were configured with 2 or 3 adjacent carriers on the downlink, then it can support DC-HSUPA.

It will be appreciated that the need for such differentiation is due to the interference from the second uplink to downlink in certain bands.

For dual-band operation, there may be up to 3 or 4 carriers configured in two bands, and the following exemplary signaling mechanism may be adopted.

First, the existing Rel-9 Band Combination table (see Table 1 hereinabove) may continue to be adopted for signaling. The table may be modified by adding a new entry only when it differs in terms of the downlink frequency band. In other words, do not distinguish further in this table the number of downlink carriers supported in each band.

Second, an extension table may be introduced for each entry of the Band Combination table. This extension table may include a first set of bits to signal whether each of a plurality of specific downlink carrier allocations across bands is supported by the UE, and a second set of bits to signal whether the UE supports DC-HSUPA for each of a plurality of specific downlink carrier allocations across bands.

Figure 1B:
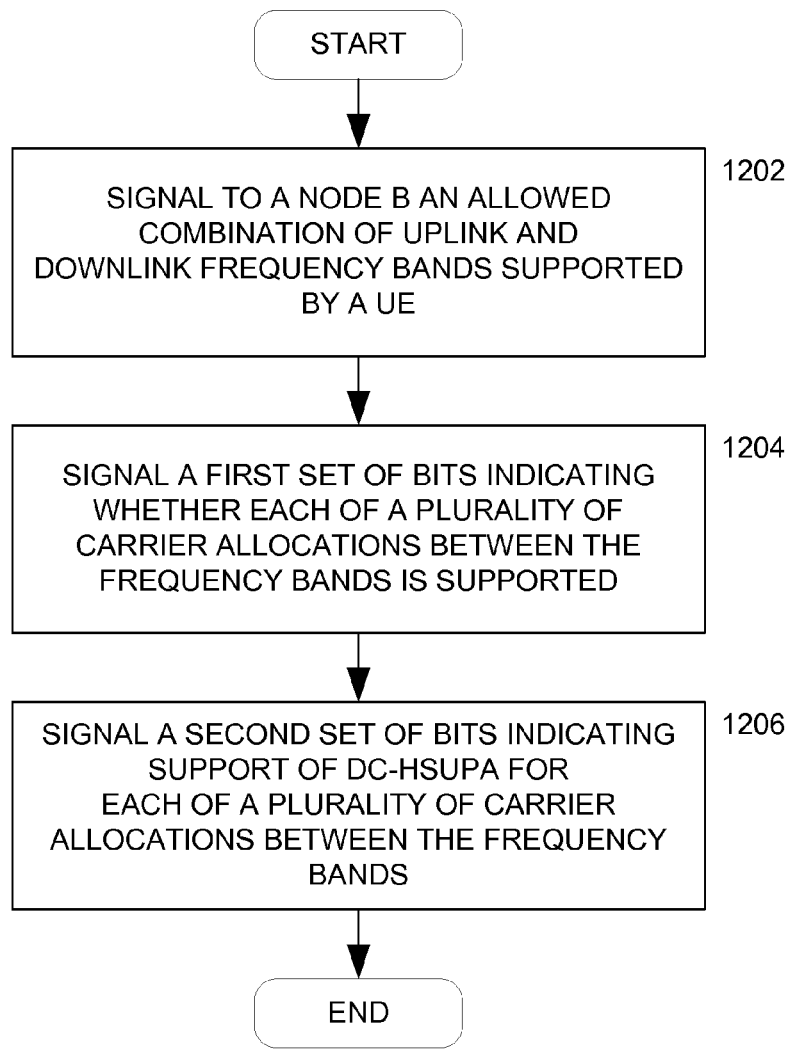

FIG. 1B illustrates a UE capabilities signaling process 1200 for UE capabilities signaling in a dual band where, at block 1202, an allowed combination of uplink and downlink frequency bands supported by a UE is signaled to a Node B.

At block 1204, a first set of bits is signaled indicating whether each of a plurality of carrier allocations between the frequency bands is supported. In an example, the first set of bits of the extension table may include 6 bits to signal the support of each of the following specific downlink carrier allocations: (1,1), (2,1), (1,2), (3,1), (1,3), and (2,2). For example, a six-bit sequence of 111000 may indicate that the carrier allocations (1,1), (2,1), (1,2) are supported, but the carrier allocations (3,1), (1,3), and (2,2) are not. Furthermore, note that the support of allocations (3,0), (0,3), (4,0), (0,4) need not be separately provided for in the extension table, as this information may be signaled using pre-existing single-band signaling mechanisms.

At block 1206, a second set of bits is signaled indicating support of DC-HSUPA for each of a plurality of carrier allocations between the frequency bands. Continuing with the example, for a DC-HSUPA capable UE, the second set of bits of the extension table may include 6 bits to signal the support of DC-HSUPA for each of the following downlink carrier allocations: (2,1), (1,2), (3,1), (1,3), and (2,2). Note that two of those six bits should be reserved for the (2,2) carrier allocation, as one bit would be needed to signal support of DC-HSUPA in each of the 2 bands. For the remaining four carrier allocations, since 1 carrier is supported in one of the bands, DC-HSUPA support automatically applies to the other band. Further, for the (1,3) and (3,1) carrier allocations, support of DC-HSUPA means that any adjacent 2 of the 3 carriers can be configured in DC-HSUPA.

For example, a UE may signal that it supports the carrier combination (2,2) for the two bands using the first set of bits, but only supports DC-HSUPA in the first band if only one downlink carrier is configured in the other band using the second set of bits. In other words, if a UE is configured with (2,2) on the two bands, it cannot be configured with dual uplinks, but if it were configured with (2,1) on the two bands, then it could support DC-HSUPA in the first band.

As previously mentioned herein, the need for such differentiation is due to the interference from the second uplink to downlink in certain bands.

It will be appreciated that the use of extension tables as described herein advantageously conveys complete information on DC-HSUPA supportability by a UE. Furthermore, there is no issue of scalability of the table size or length in the feedback.

In an alternative approach, the UE may signal its support of certain band and carrier combinations as shown in Table 2. In particular, the UE may signal its support of a particular "scenario" shown in Table 2, each scenario specifying a band combination (i.e., combination of Band A and Band B band numbers) together with the number of supported downlink adjacent carriers in each band. The particular scenario may be signaled using, e.g., a first set of bits.

TABLE 2

Alternative signalling by UE.

| | | Band A | Band B | |
|---|---|---|---|---|
| Scenario | Band number | Number of DL adjacent carriers | Band number | Number of DL adjacent carriers |
| 2 | I | 3 | N/A | N/A |
| 3 | I | 3 | VIII | 1 |
| 5 | I | 2 | VIII | 1 |
| 8 | I | 2 | V | 2 |
| 9 | I | 2 | V | 1 |
| 11 | II | 2 | IV | 2 |
| 12 | II | 2 | IV | 1 |
| 13 | II | 1 | IV | 2 |

It should be understood that the table above is shown for illustrative purposes only, and is not meant to limit the scope of the present disclosure to any particular list of possible scenarios. One of ordinary skill in the art will appreciate that alternative band and carrier combinations and supportable carriers may be readily encapsulated in a table format, and be assigned identifiers for signalling according to the disclosure set forth herein.

It will be appreciated that one limitation of a signaling mechanism based on signaling of "scenarios" in the above table is that for future expansions to the table, the number of entries required to specify each new band combination, as well as the number of entries the UE must signal to the Node B, may rapidly multiply. For example, for a 4C-capable UE, potentially 5 entries are needed for each band combination: (2,1), (1,2), (3,1), (1,3) and (2,2). If the UE can support all of these carrier combinations for a given band combination, the UE must separately signal the five entries by using, for example, five separate codewords, to fully convey the information about its capability to the Node B for each band combination. Furthermore, there may be an upper limit on the total number of entries the UE is allowed to signal to the Node B regarding its carrier combination capabilities. For example, a version of the standard may specify that the UE may signal only up to 16 entries of the table to the Node B. Thus it would be desirable to simplify the signaling mechanism required to allow the UE to fully signal its capabilities to the Node B.

In one aspect of the UE capabilities signaling, to reduce the number of separate entries the UE must signal to convey its capabilities, certain rules for implied supportability may be introduced in the signaling mechanism. For example, the signaling of support by a UE for a higher (e.g., (3, 1)) carrier combination, such as for band combination Band A and Band B, may be taken to imply that the UE also supports a lower (e.g., (2, 1)) carrier combination in Band A and Band B. In this way, not every carrier combination supported by the UE needs to be separately signaled to the Node B.

It will be appreciated that the table used by the UE must be synchronized with the table used by the Node B for proper signaling to occur. For example, the UE may signal its support of (3,1) and thereby also indicate its support of (2,1). However, the Node B might not properly recognize the UE's intent to signal support of (3, 1) as well as (2, 1), if the Node B is using a different version of a table from the UE. In this case, the Node B may misinterpret the UE's signal, or not recognize the UE's signal at all.

In one aspect of the UE capabilities signaling, to ensure that the UE and Node B tables are synchronized, a sequential version number may be assigned each time the table is expanded. In this case, the Node B may broadcast its table version as a table version number in the System Information Block (SIB), and the UE may listen to this broadcasted table version number. In response to receiving the table version number broadcasted by the network, the UE may be configured to signal only those entries that are also present in the network version of the table.

For example, suppose the table stored at the Node B is identified by a version number 1, and contains entries corresponding to carrier combinations for, e.g., twenty bands. The UE, on the other hand, may have access to table version number 1, as well as a newer table identified by a version number 2 that contains entries corresponding to carrier combinations for twenty-five bands. In this case, the Node B broadcasts its table version as version number 1. By listening to this broadcast, the UE will know to use table version number 1 and not table version number 2 when communicating with the broadcasting Node B. In this manner, communications between the UE and Node B tables are synchronized.

Figure 1C:
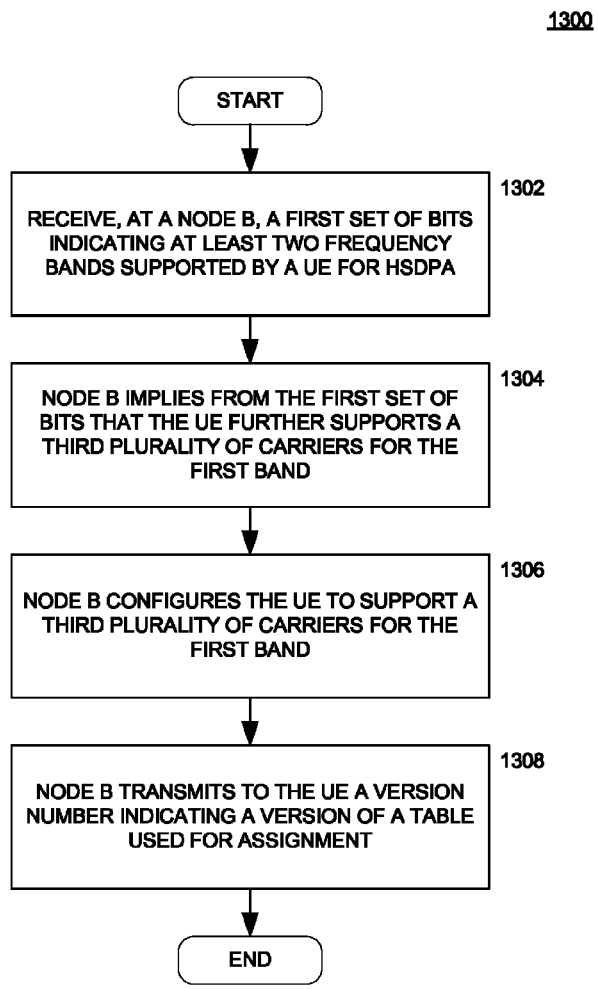

FIG. 1C illustrates a UE capabilities signaling process 1300 for a Node B configured in accordance with one aspect of the disclosed approach, where at block 1302, the Node B receives a first set of bits indicating at least two frequency bands supported by a UE for HSDPA. The first set of bits further specifies a number of downlink adjacent carriers supported by the UE for each of the at least two frequency bands. The first set of bits indicates that the UE supports a first plurality of carriers for a first band and a second plurality of carriers for a second band.

At block 1304, the Node B implies from the first set of bits that the UE further supports a third plurality of carriers for the first band. The number of the third plurality of carriers is less than the number of the second plurality of carriers.

At block 1306, the Node B configures the UE to support a third plurality of carriers for the first band. The number of the third plurality of carriers is less than the number of the second plurality of carriers.

At block 1308, the Node B transmits to the UE a version number indicating a version of a table used for assigning the first set of bits to a carrier combination and number of supportable downlink carriers.

Figure 1D:
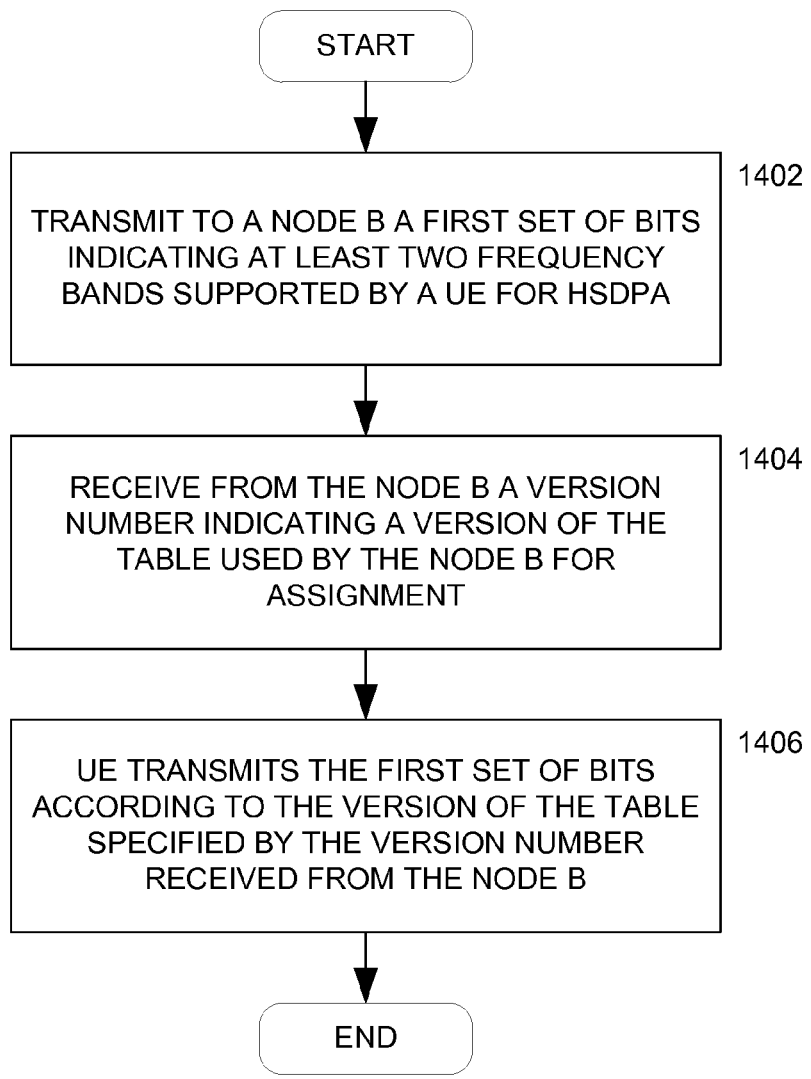

FIG. 1D illustrates a UE signaling process 1400 for a UE configured in accordance with one aspect of the disclosure, where at block 1402, the method includes transmitting to a Node B a first set of bits indicating at least two frequency bands supported by a UE for HSDPA. The first set of bits further specifies a number of downlink adjacent carriers supported by the UE for each of the at least two frequency band. The first set of bits indicates that the UE supports a first plurality of carriers for a first band and a second plurality of carriers for a second band.

At block 1404, the method includes receiving from the Node B a version number indicating a version of the table used by the Node B for assigning the first set of bits to a carrier combination and number of supportable downlink carriers.

At block 1406, the UE transmits the first set of bits according to the version of the table specified by the version number received from the Node B.

Figure 2:
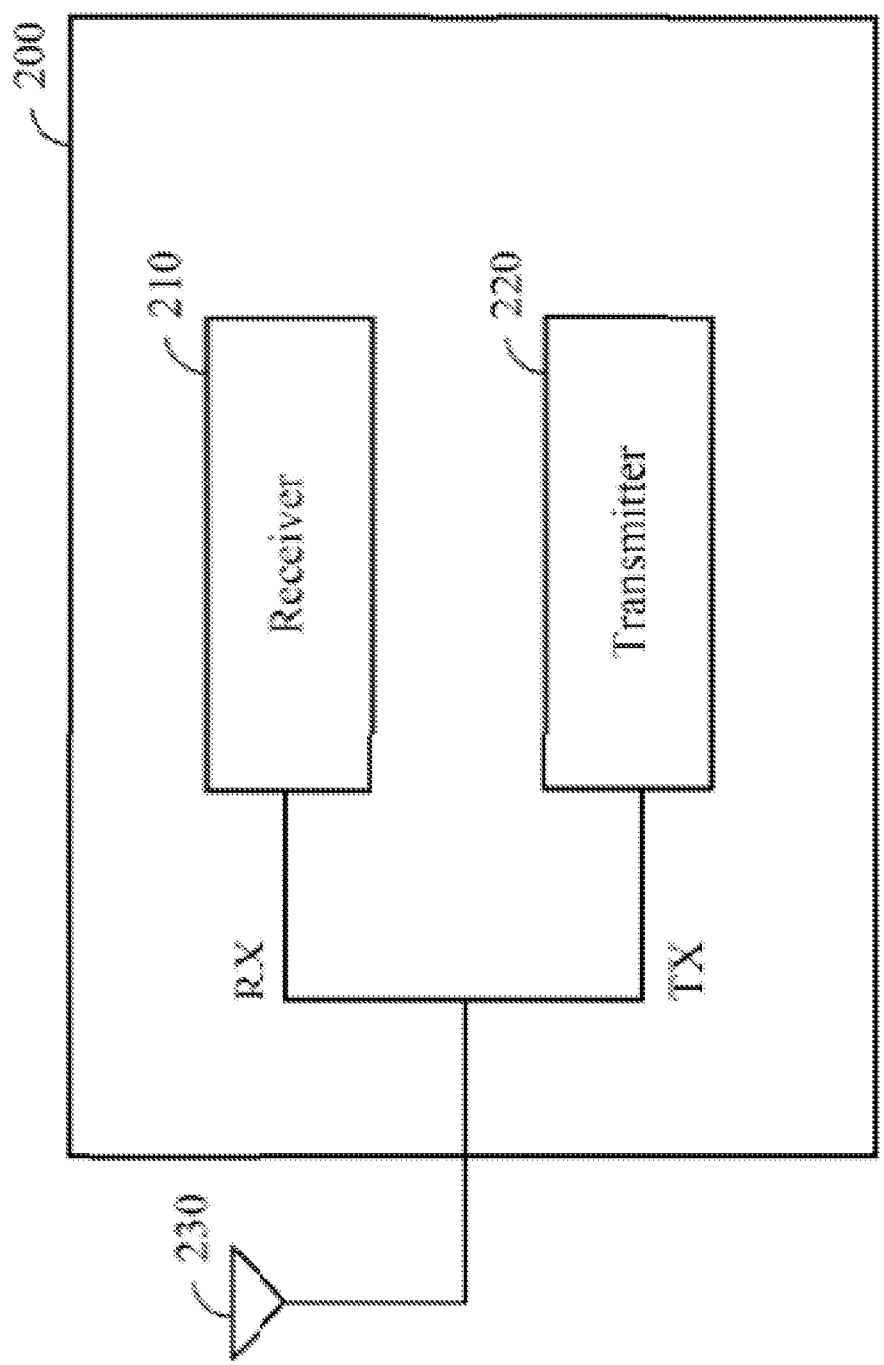
FIG. 2 is a block diagram of an example apparatus that may be used to implement a wireless node for the system set forth herein.

FIG. 2 illustrates an exemplary embodiment 200 of an apparatus according to the present disclosure. The apparatus 200 may be, e.g., either a UE or Node B operating according to the principles described herein. In FIG. 2, the apparatus 200 is coupled to an antenna 230 for transmitting (TX) and receiving (RX) wireless signals.

In a Node B exemplary embodiment, the apparatus 200 includes a receiver 210 configured to receive at a Node B a first set of bits indicating at least two frequency bands supported by a UE for HSDPA, with the first set of bits further specifying a number of downlink adjacent carriers supported by the UE for each of the at least two frequency bands. The apparatus 200 further includes a transmitter 220 configured to signal to the UE to support a specific number of carriers for each of the at least two frequency bands.

In a UE exemplary embodiment, the apparatus 200 includes a transmitter 220 configured to transmit to a Node B a first set of bits indicating at least two frequency bands supported by a UE for HSDPA, with the first set of bits further specifying a number of downlink adjacent carriers supported by the UE for each of the at least two frequency bands. The apparatus 200 further includes a receiver 210 configured to receive from the Node B a configuration of carriers to be supported by the UE.

Further described herein with reference to FIGS. 3-6 is an example of a radio network operating according to UMTS in which the principles of the disclosure may be applied. Node Bs 110, 111, 114 and radio network controllers 141-144 are parts of a network called a "radio network," "RN," "access network (AN)." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit switched and IP-based packet-switched traffic types. The UTRAN provides an air interface access method for the user equipment (UE) 123-127. Connectivity is provided between the UE (user equipment) and the core network by the UTRAN. The radio network may transport data packets between multiple user equipment devices 123-127.

Figure 3:
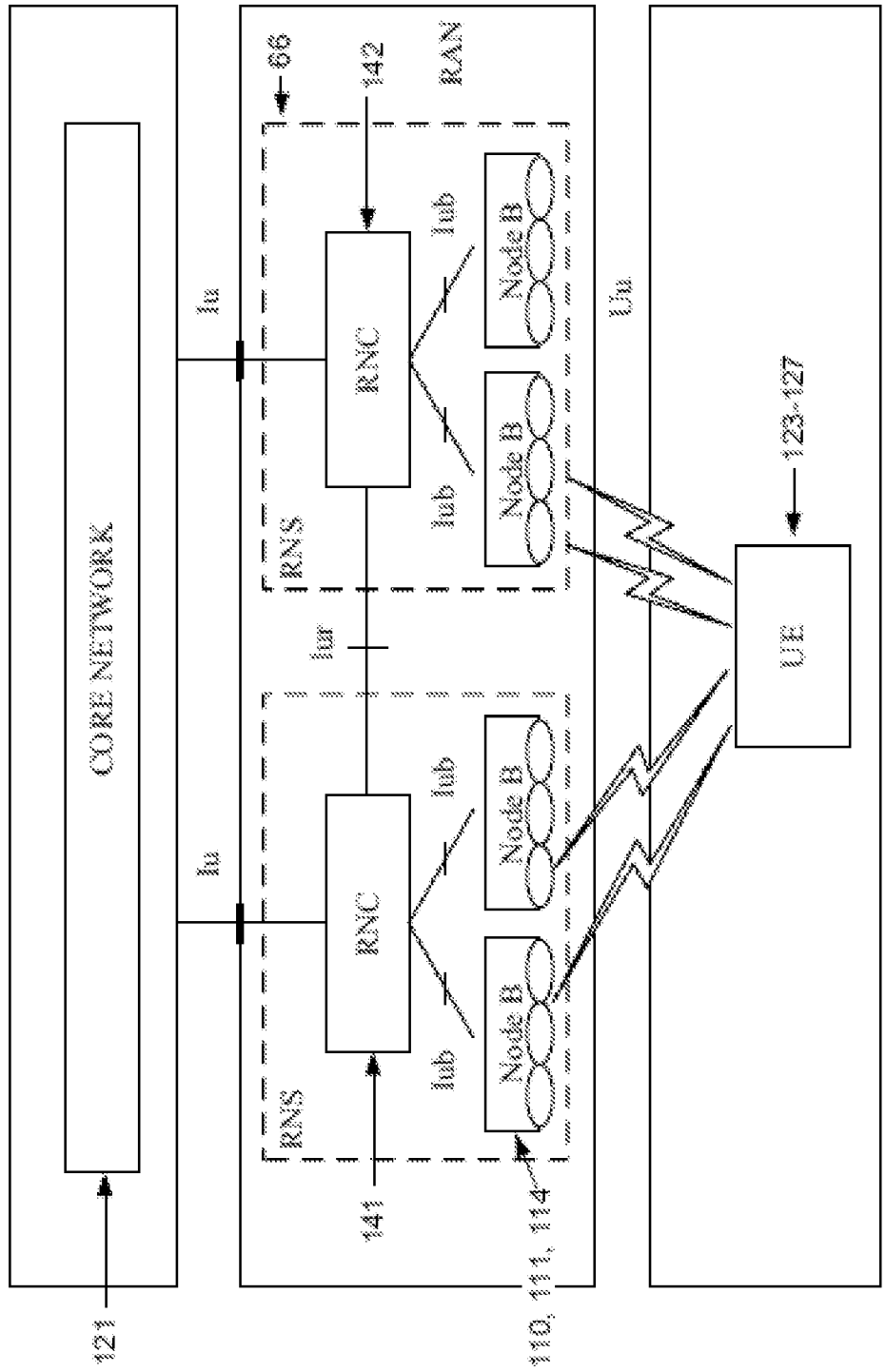
FIG. 3 is a block diagram of the operation of the UE with a core network in the system set forth herein.

The UTRAN is connected internally or externally to other functional entities by four interfaces: Iu, Uu, Iub and Iur. The UTRAN is attached to a GSM core network 121 via an external interface called Iu. Radio network controller (RNC) 141-144 (shown in FIG. 4), of which 141, 142 are shown in FIG. 3, supports this interface. In addition, the RNCs 141-144 manage a set of base stations called Node Bs through interfaces labeled Iub. The Iur interface connects the two RNCs 141-142 with each other. The UTRAN is largely autonomous from the core network 121 since the RNCs 141-144 are interconnected by the Iur interface. FIG. 3 discloses a communication system which uses the RNC, the Node Bs and the Iu and Uu interfaces. The Uu is also external and connects the Node Bs 110, 111, 114 with the UE 123-127, while the Iub is an internal interface connecting the RNC 142-144 with the Node Bs 110, 111, 114.

The radio network may be further connected to additional networks outside the radio network, such as a corporate intranet, the Internet, or a conventional public switched telephone network as stated above, and may transport data packets between each user equipment device 123-127 and such outside networks.

Figure 4:
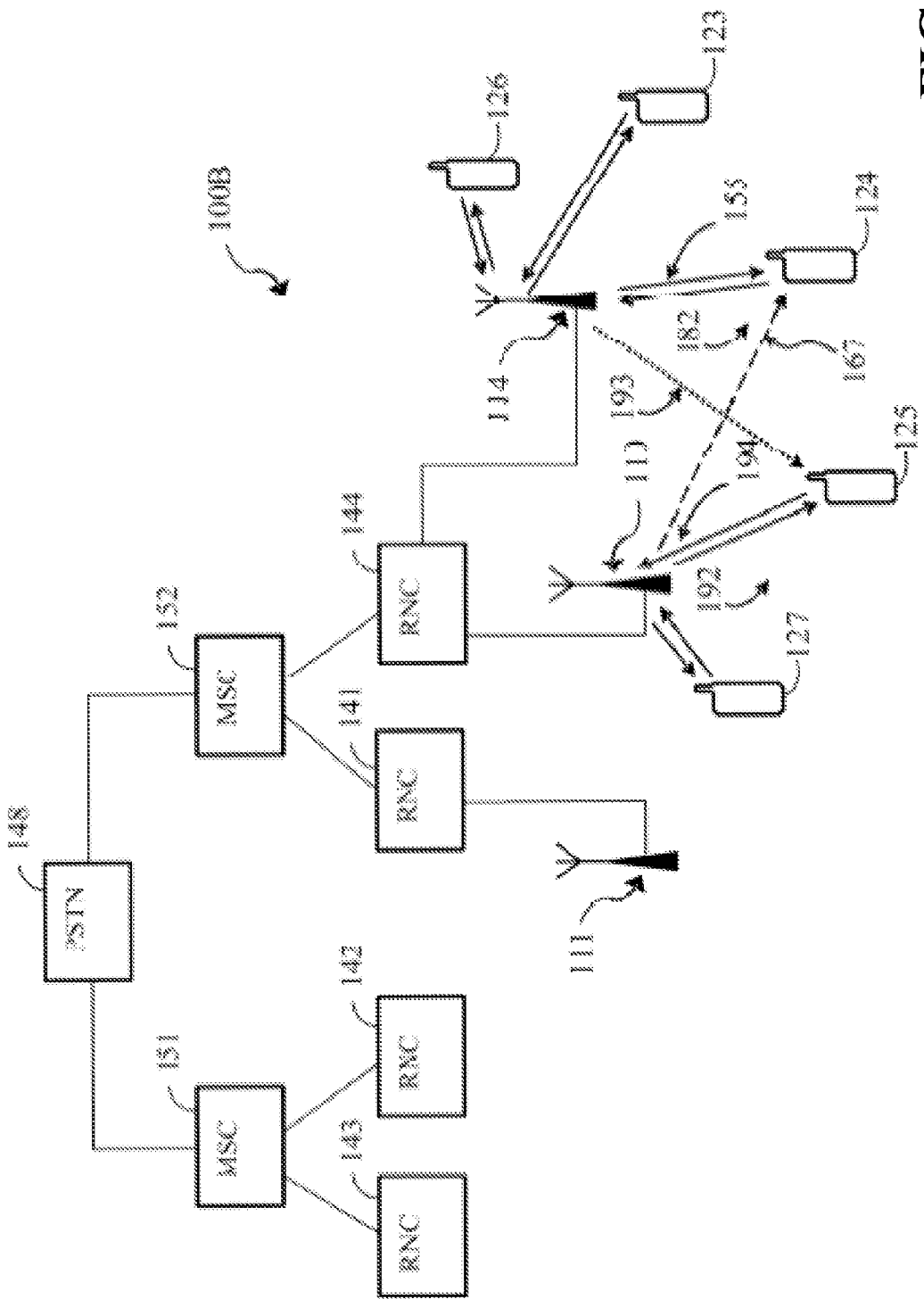
FIG. 4 is a block diagram of selected components of a communication network in which the UE capabilities signaling approaches described herein may be implemented.

FIG. 4 illustrates selected components of a communication network 100, which includes radio network controller (RNC) (or base station controllers (BSC)) 141-144 coupled to Node Bs (or base stations or wireless base transceiver stations) 110, 111, and 114. The Node Bs 110, 111, 114 communicate with user equipment (or remote stations) 123-127 through corresponding wireless connections 155, 167, 182, 192, 193, 194. A communications channel includes a forward link (FL) (also known as a downlink) for transmissions from the Node B 110, 111, 114 to the user equipment (UE) 123-127, and a reverse link (RL) (also known as an uplink) for transmissions from the UE 123-127 to the Node B 110, 111, 114. The RNCs 141-144 provides control functionalities for one or more Node Bs. The radio network controllers 141-144 are coupled to a public switched telephone network (PSTN) 148 through mobile switching centers (MSC) 151, 152. In another example, the radio network controllers 141-144 are coupled to a packet switched network (PSN) (not shown) through a packet data server node (PDSN) (not shown). Data interchange between various network elements, such as the radio network controllers 141-144 and a packet data server node, can be implemented using any number of protocols, for example, the Internet Protocol (IP), an asynchronous transfer mode (ATM) protocol, T1, E1, frame relay, or other protocols.

Each RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. The RNC is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each remote station 123-127 uses an orthogonal variable spreading factor (OVSF) code. An OVSF code is an orthogonal code that facilitates uniquely identifying individual communication channels. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is a receiver that aligns its PN sequences to those of the Node B 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots.

W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems uses synchronization channels and a cell searching technique.

3GPP Release 5 and later supports High-Speed Downlink Packet Access (HSDPA). 3GPP Release 6 and later supports High-Speed Uplink Packet Access (HSUPA) HSDPA and HSUPA are sets of channels and procedures that enable high-speed packet data transmission on the downlink and uplink, respectively. Release 7 HSPA+ uses three enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 110, 111, 114 allows several user equipment devices 123-127 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 123-127 indicates to the device which codes within the code space will be used to send downlink payload data to the device, and the modulation that will be used for transmission of the downlink payload data.

With HSDPA operation, downlink transmissions to the user equipment devices 123-127 may be scheduled for different transmission time intervals using the 15 available HSDPA OVSF codes. For a given TTI, each user equipment device 123-127 may be using one or more of the 15 HSDPA codes, depending on the downlink bandwidth allocated to the device during the TTI.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 123-127 may be any data device that communicates through a wireless channel or through a wired channel, for example using fiber optic or coaxial cables. An access terminal 123-127 may be any of a number of types of devices including but not limited to PC card, compact flash, external or internal modem, or wireless or wireline phone. The access terminal 123-127 is also known as user equipment (UE), a remote station, a mobile station or a subscriber station. Also, the UE 123-127 may be mobile or stationary.

User equipment 123-127 that has established an active traffic channel connection with one or more Node Bs 110, 111, 114 is called active user equipment 123-127, and is said to be in a traffic state. User equipment 123-127 that is in the process of establishing an active traffic channel connection with one or more Node Bs 110, 111, 114 is said to be in a connection setup state. The communication link through which the user equipment 123-127 sends signals to the Node B 110, 111, 114 is called an uplink. The communication link through which Node B 110, 111, 114 sends signals to a user equipment 123-127 is called a downlink.

Figure 5:
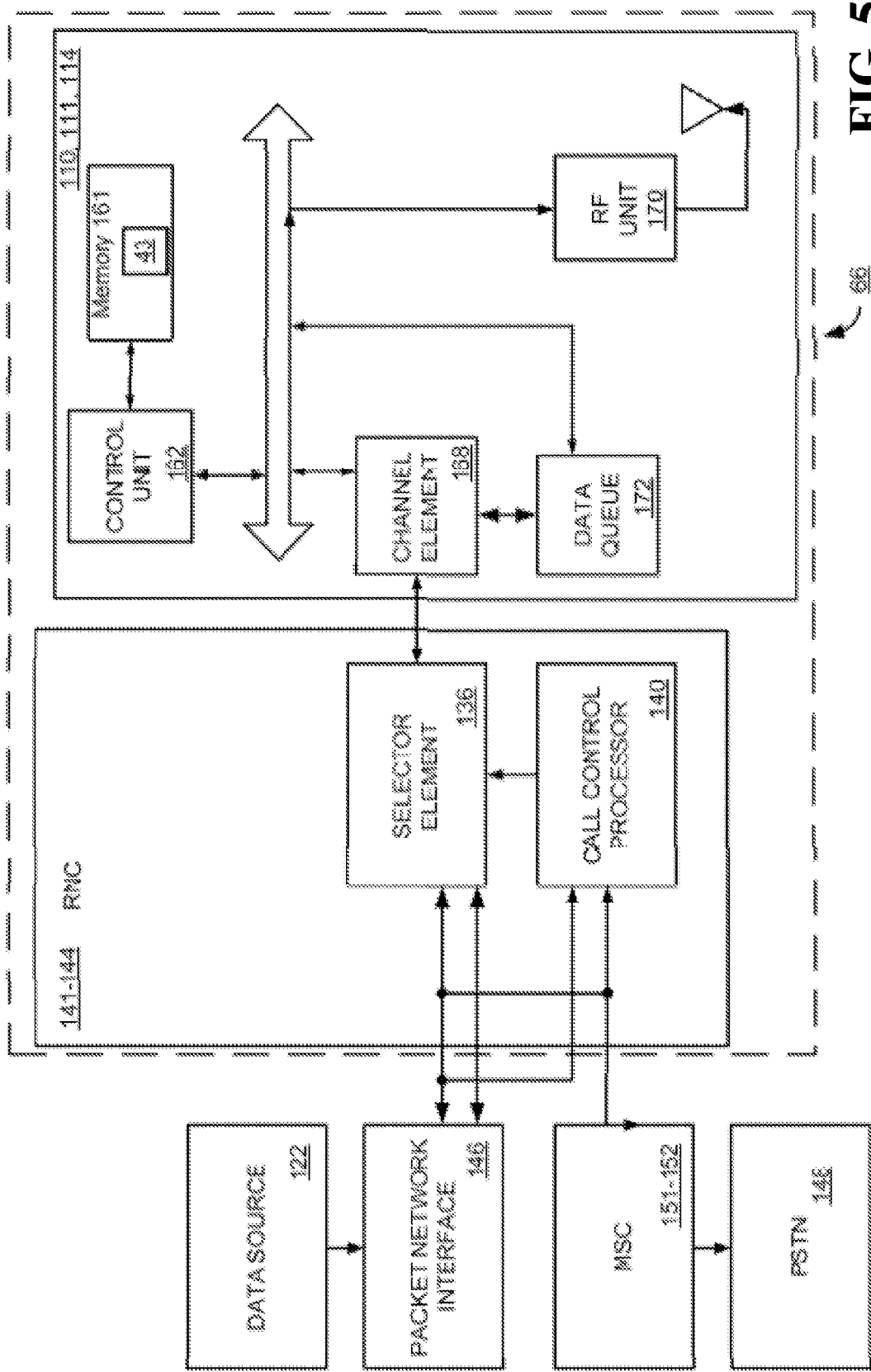
FIG. 5 is a block diagram of various components of the communication network of FIG. 4.

FIG. 5 is detailed herein below, wherein specifically, a Node B 110, 111, 114 and radio network controllers 141-144 interface with a packet network interface 146. (Note in FIG. 5, only one of the Nodes B 110, 111, 114 and only one of the RNCs 141-144 is shown for simplicity). The Node B 110, 111, 114 and radio network controller 141-144 may be part of a radio network server (RNS) 66, shown in FIG. 3 and in FIG. 5 as a dotted line surrounding one or more Node Bs 110, 111, 114 and the radio network controller 141-144. The associated quantity of data to be transmitted is retrieved from a data queue 172 in the Node B 110, 111, 114 and provided to the channel element 168 for transmission to the user equipment 123-127 associated with the data queue 172.

The radio network controller 141-144 interfaces with the Public Switched Telephone Network (PSTN) 148 through a mobile switching center 151, 152. Also, radio network controller 141-144 interfaces with Node Bs 110, 111, 114 in the communication system 100 (only one Node B 110, 111, 114 is shown in FIG. 4 for simplicity). In addition, the radio network controller 141-144 interfaces with a Packet Network Interface 146. The radio network controller 141-144 coordinates the communication between the user equipment 123-127 in the communication system and other users connected to packet network interface 146 and PSTN 148. The PSTN 148 interfaces with users through a standard telephone network (not shown in FIG. 5).

The radio network controller 141-144 contains many selector elements 136, although only one is shown in FIG. 5 for simplicity. Each selector element 136 is assigned to control communication between one or more Node B's 110, 111, 114 and one remote station 123-127 (not shown). If the selector element 136 has not been assigned to a given user equipment 123-127, a call control processor 140 is informed of the desire to page the user equipment 123-127. The call control processor 140 then directs the Node B 110, 111, 114 to page the user equipment 123-127.

Data source 122 contains a quantity of data, which is to be transmitted to a given user equipment 123-127. The data source 122 provides the data to the packet network interface 146. The packet network interface 146 receives the data and routes the data to the selector element 136. The selector element 136 then transmits the data to the Node B 110, 111, 114 in communication with the target user equipment 123-127. In one example, each Node B 110, 111, 114 maintains a data queue 172 which stores the data to be transmitted to the user equipment 123-127.

For each data packet, a channel element 168 inserts the necessary control fields. In one example, the channel element 168 performs a cyclic redundancy check, CRC, encoding of the data packet and control fields and inserts a set of code tail bits. The data packet, control fields, CRC parity bits, and code tail bits comprise a formatted packet. The channel element 168 then encodes the formatted packet and interleaves (or reorders) the symbols within the encoded packet. The interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 123-127, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder which performs the inverse of the signal processing functions done at the Node B 110, 111, 114, specifically the de-interleaving, decoding, and CRC check functions. The decoded data is provided to a data sink.

Figure 6:
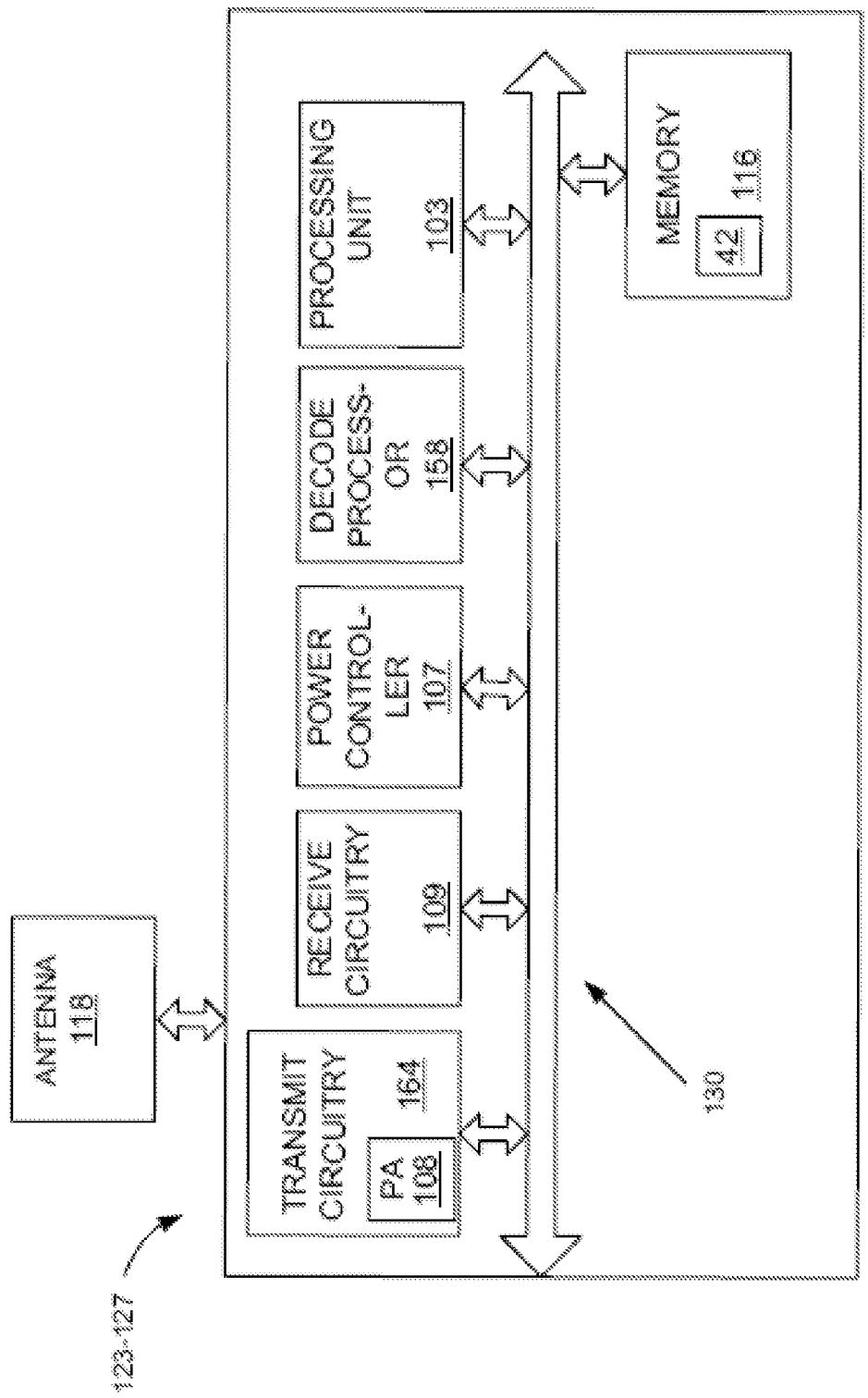
FIG. 6 is a block diagram of a UE that may be used in the system set forth herein.

FIG. 6 illustrates an example of a user equipment (UE) 123-127 in which the UE 123-127 includes transmit circuitry 164 (including PA 108), receive circuitry 109, power controller 107, decode processor 158, a processing unit 103 for use in processing signals, and memory 116. The transmit circuitry 164 and the receive circuitry 109 may allow transmission and reception of data, such as audio communications, between the UE 123-127 and a remote location. The transmit circuitry 164 and receive circuitry 109 may be coupled to an antenna 118.

The processing unit 103 controls operation of the UE 123-127. The processing unit 103 may also be referred to as a CPU. Memory 416, which may include both read-only memory (ROM) and random access memory (RAM), provides instructions and data to the processing unit 103. A portion of the memory 116 may also include non-volatile random access memory (NVRAM).

The various components of the UE 123-127 are coupled together by a bus system 130 which may include a power bus, a control signal bus, and a status signal bus in addition to a data bus. For the sake of clarity, the various busses are illustrated in FIG. 6 as the bus system 130.

The steps of the methods discussed may also be stored as instructions in the form of software or firmware 43 located in memory 161 in the Node B 110, 111, 114, as shown in FIG. 5. These instructions may be executed by the control unit 162 of the Node B 110, 111, 114 in FIG. 5. Alternatively, or in conjunction, the steps of the methods discussed may be stored as instructions in the form of software or firmware 42 located in memory 116 in the UE 123-127. These instructions may be executed by the processing unit 103 of the UE 123-127 in FIG. 6.

Figure 7:
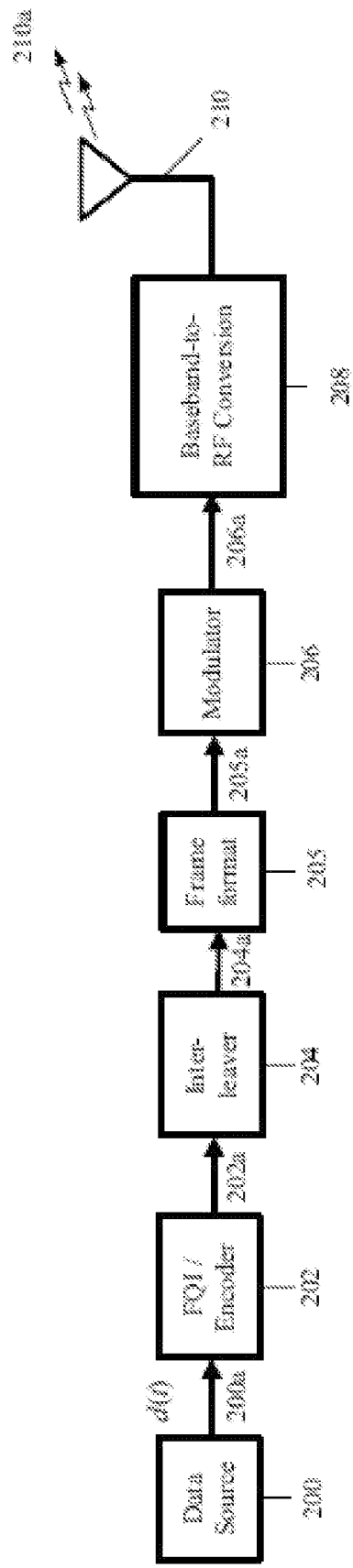
FIG. 7 is a block diagram that illustrates a transmitter structure and/or process that may be used to implement the system set forth herein.

FIG. 7 illustrates an example of a transmitter structure and/or process, which may be implemented, e.g., at user equipment 123-127. The functions and components shown in FIG. 7 may be implemented by software, hardware, or a combination of software and hardware. Other functions may be added to FIG. 5 in addition to or instead of the functions shown in FIG. 5.

In FIG. 7, a data source 200 provides data d(t) or 200a to an FQI/encoder 202. The FQI/encoder 202 may append a frame quality indicator (FQI) such as a cyclic redundancy check (CRC) to the data d(t). The FQI/encoder 202 may further encode the data and FQI using one or more coding schemes to provide encoded symbols 202a. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 204 interleaves the encoded data symbols 202a in time to combat fading, and generates symbols 204a. The interleaved symbols of signal 204a may be mapped by a frame format block 205 to a pre-defined frame format to produce a frame 205a. In an example, a frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 204a are segmented into a plurality S of sub-segments making up a frame 205a.

A frame format may further specify the inclusion of, e.g., control symbols (not shown) along with the interleaved symbols 204a. Such control symbols may include, e.g., power control symbols, frame format information symbols, etc.

A modulator 206 modulates the frame 205a to generate modulated data 206a. Examples of modulation techniques include binary phase shift keying (BPSK) and quadrature phase shift keying (QPSK). The modulator 206 may also repeat a sequence of modulated data.

A baseband-to-radio-frequency (RF) conversion block 208 may convert the modulated signal 206a to RF signals for transmission via an antenna 210 as signal 210a over a wireless communication link to one or more Node B station receivers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure and claims.

Various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description is provided to enable any person skilled in the art to make or use the disclosed methods and apparatuses. Various modifications to these methods and apparatuses will be readily apparent to those skilled in the art, and the generic principles defined herein may be applied to other examples without departing from the spirit or scope of the description or claims. Thus, the claims are not intended to be limited to the examples shown herein but are to be accorded the widest scope consistent with the principles and novel features disclosed herein.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Therefore, the disclosure is not to be limited except in accordance with the following claims.

What is claimed is:

1. A method for wireless communication comprising:
transmitting to a Node B a first set of bits indicating at least two frequency bands supported by a User Equipment (UE) for High Speed Downlink Packet Access (HSDPA), wherein the first set of bits are assigned to a carrier combination and a number of supportable downlink carriers according to a table, and wherein the first set of bits further specify a number of downlink adjacent carriers supported by the UE for each of the at least two frequency bands; and
receiving from the Node B a configuration of carriers to be supported by the UE and a version number indicating a version of the table used by the Node B.

2. The method of claim 1, wherein the UE transmits the first set of bits according to the version of the table indicated by the version number received from the Node B.

3. An apparatus for wireless communication comprising:
a transmitter configured to transmit to a Node B a first set of bits indicating at least two frequency bands supported by a User Equipment (UE) for High Speed Downlink Packet Access (HSDPA), wherein the first set of bits are assigned to a carrier combination and a number of supportable downlink carriers according to a table, and wherein the first set of bits further specify a number of downlink adjacent carriers supported by the UE for each of the at least two frequency bands; and
a receiver configured to receive from the Node B a configuration of carriers to be supported by the UE and a version number indicating a version of the table used by the Node B.

4. The apparatus of claim 3, wherein the transmitter is further configured to transmit the first set of bits according to the version of the table indicated by the version number received from the Node B.

5. An apparatus for wireless communication comprising:
means for transmitting to a Node B a first set of bits indicating at least two frequency bands supported by a User Equipment (UE) for High Speed Downlink Packet Access (HSDPA), wherein the first set of bits are assigned to a carrier combination and a number of supportable downlink carriers according to a table, and wherein the first set of bits further specify a number of downlink adjacent carriers supported by the UE for each of the at least two frequency bands; and
means for receiving from the Node B a configuration of carriers to be supported by the UE and a version number indicating a version of the table used by the Node B.

6. The apparatus of claim 5, wherein the means for transmitting the first set of bits comprises means for transmitting the first set of bits according to the version of the table indicated by the version number received from the Node B.

7. A computer program product for wireless communication comprising:
a non-transitory machine-readable medium comprising instructions executable for:
transmitting to a Node B a first set of bits indicating at least two frequency bands supported by a User Equipment (UE) for High Speed Downlink Packet Access (HSDPA), wherein the first set of bits are assigned to a carrier combination and a number of supportable downlink carriers according to a table, and wherein the first set of bits further specify a number of downlink adjacent carriers supported by the UE for each of the at least two frequency bands; and
receiving from the Node B a configuration of carriers to be supported by the UE and a version number indicating a version of the table used by the Node B.

8. The computer program product of claim 7, wherein the UE transmits the first set of bits according to the version of the table indicated by the version number received from the Node B.

9. A method for wireless communication comprising: signaling a first set of bits indicating a maximum downlink channel bandwidth supported by a User Equipment (UE) for each of at least one frequency band supported, wherein the first set of bits includes information as to whether each of a plurality of specific downlink carrier combinations across the at least one frequency band is supported by the UE; and signaling a second set of bits indicating a maximum configuration of downlink channel bandwidth for which the UE will further accommodate multicarrier uplink transmissions; and wherein each of the plurality of specific downlink carrier combinations has a corresponding first number and second number, the first number indicating a maximum number of carriers that the UE can support for an anchor band, and the second number indicating a maximum number of carriers that the UE can support for a non-anchor band.

10. The method of claim 9, wherein the first set of bits specifying one of four possible bandwidths: 5, 10, 15, or 20 MHz.

11. The method of claim 9, wherein the second set of bits specifying one of three possible bandwidths: 10, 15, or 20 MHz.

12. The method of claim 9, further comprising signaling per band support of Universal Mobile Telecommunications System (UMTS) using Radio Resource Control (RRC) signaling.

13. An apparatus for wireless communication comprising: means for signaling a first set of bits indicating a maximum downlink channel bandwidth supported by a User Equipment (UE) for each of at least one frequency band supported, wherein the first set of bits includes information as to whether each of a plurality of specific downlink carrier combinations across the at least one frequency band is supported by the UE; and means for signaling a second set of bits indicating a maximum configuration of downlink channel bandwidth for which the UE will further accommodate multicarrier uplink transmissions; and wherein each of the plurality of specific downlink carrier combinations has a corresponding first number and second number, the first number indicating a maximum number of carriers that the UE can support for an anchor band, and the second number indicating a maximum number of carriers that the UE can support for a non-anchor band.

14. The apparatus of claim 13, wherein the first set of bits specifying one of four possible bandwidths: 5, 10, 15, or 20 MHz.

15. The apparatus of claim 13, wherein the second set of bits specifying one of three possible bandwidths: 10, 15, or 20 MHz.

16. The apparatus of claim 13, further comprising means for signaling per band support of Universal Mobile Telecommunications System (UMTS) using Radio Resource Control (RRC) signaling.

17. A computer program product for wireless communication comprising:
a non-transitory machine-readable medium comprising instructions executable for:
signaling a first set of bits indicating a maximum downlink channel bandwidth supported by a User Equipment (UE) for each of at least one frequency band supported,
wherein the first set of bits includes information as to whether each of a plurality of specific downlink carrier combinations across the at least one frequency band is supported by the UE; and
signaling a second set of bits indicating a maximum configuration of downlink channel bandwidth for which the UE will further accommodate multicarrier uplink transmissions.

18. The computer program product of claim 17, wherein the first set of bits specifying one of four possible bandwidths: 5, 10, 15, or 20 MHz.

19. The computer program product of claim 17, wherein the second set of bits specifying one of three possible bandwidths: 10, 15, or 20 MHz.

20. The computer program product of claim 17, wherein the non-transitory machine-readable medium further comprises instructions executable for signaling per band support of Universal Mobile Telecommunications System (UMTS) using Radio Resource Control (RRC) signaling.

21. The method of claim 9, wherein:
the UE supports a set number of carriers,
each of the plurality of specific downlink carrier combinations comprises a different combination of the set number of carriers, and
each combination has a corresponding first number and second number, the first number indicating a maximum number of carriers that the UE can support for an anchor band, and the second number indicating a maximum number of carriers that the UE can support for a non-anchor band.

* * * * *